L. L. OLSON.
POTATO MASHER.
APPLICATION FILED APR. 18, 1912.
1,084,102.
Patented Jan. 13, 1914.
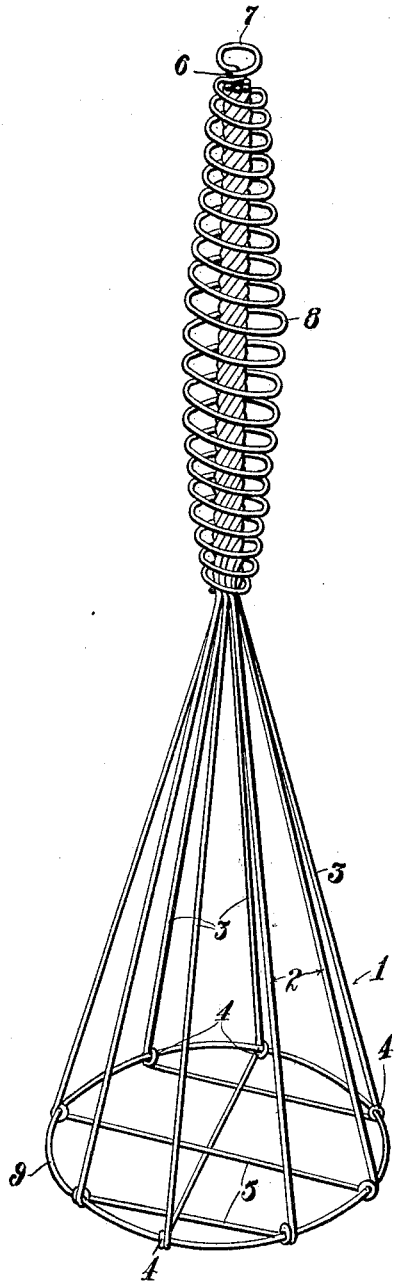

UNITED STATES PATENT OFFICE.

LOUISE L. OLSON, OF VAN HORN, IOWA.

POTATO-MASHER.

1,084,102.  Specification of Letters Patent.  Patented Jan. 13, 1914.

Application filed April 18, 1912.  Serial No. 691,711.

*To all whom it may concern:*

Be it known that I, LOUISE L. OLSON, a citizen of the United States, residing at Van Horn, in the county of Benton, State of Iowa, have invented certain new and useful Improvements in Potato-Mashers; and I do hereby declare the following to be a full, clear, and exact description of the invention, such as will enable others skilled in the art to which it appertains to make and use the same.

This invention relates to potato mashers, and particularly to one having its head made from wire.

The invention has for its object to produce an article of this character so formed that after the vegetables have been subjected to the mashing operation, the article may then be operated to thoroughly stir the mashed material.

With these and other objects in view, the invention consists in certain novel features of construction, combination and arrangement of parts as will be hereinafter fully described and claimed.

In the drawings the figure represents a perspective view of the device.

Referring to the drawing, the numeral 1 designates the head of the device, the same consisting of a plurality of single length wire sections 2. Each section comprises a pair of downwardly diverging arms 3, said arms having their extreme lower ends bent to form eyes 4, which terminate in horizontally disposed bars 5. It will be seen that the bars 5 of each section 2 are arranged in spaced parallel relation.

One of the sections is so arranged in relation to the others that the bar 5 thereof extends transversely of the other bars, and at its point of intersection therewith bears against the central under surface of one of said bars.

The upper ends of the arms 3 are twisted together throughout their lengths. One of said arms is greater in length than the others and is twisted as at 6 to form a loop 7 which terminates in spirals 8, said spirals encircling the twisted ends of the arms 3. The loop 7 serves as means for suspending the device when not in use. It will be seen that the spirals 8 form an effective grip for the device.

A ring 9 formed from wire is provided and passes through the eyes 4 of the arms 3, thus holding the bars 5 in their proper spaced relation, and at the same time forming an efficient brace for the lower end of the head 1.

After the vegetables have been thoroughly mashed upon the continual reciprocation of the head 1, the mashed material may then be whipped into a creamy state upon the proper movement of the device, as will be obvious to those skilled in the art.

What is claimed is:

A potato masher comprising a head formed from a plurality of single length wire sections, said sections consisting of downwardly diverging arms having eyes formed at their lower ends, said eyes, terminating in horizontally disposed bars, one of said sections having its bar arranged transversely of the bars of the other sections, and arranged in interwoven relation thereto, a ring passing through the eyes of said arms to hold the bars in spaced relation, the upper ends of the arms being twisted together, one of said arms being extended upwardly and formed with a loop, said loop terminating in downwardly directed spirals which encircle and are spaced from the twisted arms to form a grip.

In testimony whereof, I affix my signature, in presence of two witnesses.

LOUISE L. OLSON.

Witnesses:
JOHN C. OLSON,
C. H. HARTUNG, Jr.

Copies of this patent may be obtained for five cents each, by addressing the "Commissioner of Patents, Washington, D. C."